(12) United States Patent
Pierce et al.

(10) Patent No.: US 9,096,268 B2
(45) Date of Patent: Aug. 4, 2015

(54) CONTROL GROUP MOUNTING RELATIVE TO CONTROLLED HARDWARE

(71) Applicant: CNH AMERICA, LLC, New Holland, PA (US)

(72) Inventors: Todd B. Pierce, East Petersburg, PA (US); Philip J. Ehrhart, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 100 days.

(21) Appl. No.: 13/905,513

(22) Filed: May 30, 2013

(65) Prior Publication Data

US 2014/0353053 A1 Dec. 4, 2014

(51) Int. Cl.
*B62D 11/04* (2006.01)
*B62D 11/00* (2006.01)

(52) U.S. Cl.
CPC .............. *B62D 11/04* (2013.01); *B62D 11/006* (2013.01)

(58) Field of Classification Search
CPC ................................ B62D 11/18; B62D 11/04
USPC ................................................. 180/6.48, 6.66
See application file for complete search history.

(56) References Cited

U.S. PATENT DOCUMENTS

| 2,214,806 | A | 9/1940 | Baker et al. |
| 6,030,182 | A | 2/2000 | Voigt |
| 6,196,342 | B1 * | 3/2001 | Teal et al. ....................... 180/6.2 |
| 6,484,828 | B2 * | 11/2002 | Hidaka et al. ................ 180/6.38 |
| 6,775,976 | B1 * | 8/2004 | Phanco et al. .................. 60/484 |
| 6,779,615 | B2 | 8/2004 | Boyer et al. |
| 6,955,046 | B1 * | 10/2005 | Holder et al. ................... 60/487 |
| 7,004,268 | B2 * | 2/2006 | Irikura ........................... 180/6.3 |
| 7,207,581 | B2 * | 4/2007 | Osborne et al. .......... 280/93.502 |
| 7,270,200 | B2 * | 9/2007 | Goto et al. .................... 180/6.48 |
| 7,841,429 | B2 * | 11/2010 | Irikura ........................ 180/6.48 |
| 8,028,776 | B2 * | 10/2011 | Dong et al. ................. 180/6.48 |
| 2009/0272584 | A1 * | 11/2009 | Bordini ........................ 180/6.44 |

* cited by examiner

*Primary Examiner* — Kevin Hurley
*Assistant Examiner* — Gabriela C Craciun
(74) *Attorney, Agent, or Firm* — Patrick M. Sheldrake; Seyed V. Sharifi T.

(57) ABSTRACT

A mounting apparatus for positioning an actuator managing the pivotal position of rotatable pintel arms controlling the output of a pair of tandem-mounted hydraulic drive pumps providing motive power for an agricultural machine. The pumps are resiliently connected to the machine main frame, permitting relative movement to reduce vibration transmission to the main frame. A mounting bracket connected to the drive pumps provides a fixed connection for a first end of the actuator while the opposing second end is connected by an axially moveable linkage to the pintel arms. A common anchorage for the actuator and the pintel arms eliminates unintended pintel arm movement that occurs when anchoring the end of the actuator on the main frame.

10 Claims, 2 Drawing Sheets

CONTROL GROUP MOUNTING RELATIVE TO CONTROLLED HARDWARE

CROSS REFERENCE TO RELATED APPLICATIONS

This application is related to U.S. patent application entitled "Windrower Steering System", Ser. No. 13/905.521, filed on May 30, 2013; and U.S. patent application entitled "Windrower Autoguidance Hydraulic Steering Interface", Ser. No. 13/905,528, Filed on May 30, 2013. The above applications are herein incorporated by reference.

BACKGROUND OF THE INVENTION

The present invention relates generally to hydraulically powered differential steered agricultural machines, and more particularly to an improved assembly for controlling hydraulic pump swashplate angles in such machines.

Hydrostatic drive systems are often configured with the drive pump attached directly to the engine without a clutch or other mechanism to stop output flow of the pump while the engine is running. Drive pump displacement (output) and therefore speed in differential-steered machines is controlled by variations in swashplate angle which is adjusted by movement of external pintel arms external to the pumps. On most pumps, pintel arm and thus swashplate rotation from "neutral" to "full speed" occurs over a relatively narrow range on the order of 16-18 degrees. With such a small range of motion, it is important that the assembly controlling the angular position of the pintel arm angles be capable of precise angular control. Precise control of the swashplate angle for hydrostatic ground drive pumps on differential-steered agricultural machines is paramount, especially when operating the machine at higher travel speed such as is necessary for road transport between fields. Without precision control, relative movement between the control assembly and the swashplate can lead to unintended changes in swashplate angle, perceived by the operator as loose steering or changes in ground speed.

It would be of great advantage to provide an improved swashplate control assembly mounting that minimizes distance and thus potential for relative motion between the control assembly and the swashplate pintel arms. Additional advantages would be realized by an improved mounting system that is easily incorporated into the existing swashplate control design commonly used on current model hydrostatic drive differential-steered machines.

SUMMARY OF THE INVENTION

It would be of great advantage to provide an improved swashplate control assembly mounting that minimizes distance and thus potential for relative motion between the control assembly and the swashplate pintel arms. Additional advantages would be realized by an improved mounting system that is easily incorporated into the existing swashplate control design commonly used on current model hydrostatic drive differential-steered machines.

One embodiment of the present invention comprises a hydrostatic drive differential-steered machine having left- and right-side drive pumps tandem-mounted to an engine, each drive pump having an angularly adjustable swash plate moveable by a pivoting pintel arm and a control linkage for simultaneously moving the pintel arms. The pintel arms are moveable in a range from full forward speed to full reverse speed with an intermediate neutral position to enable forward and reverse travel as well as turning of the machine. The control linkage is configured to move the pintel arms in unison by linear motion of the control linkage and to move the pintel arms in opposition by rotary motion of the control linkage. A first input to the control linkage is by a steering wheel to control the rotary motion of the control linkage for steering the machine by adjusting the differential speed of the left and right wheels. A second input to the control linkage is a linear actuator, movement of which is managed by a forward-neutral-reverse (FNR) lever accessible to the machine operator, to adjust the speed of the wheels uniformly. The linear actuator is connected at one end to the control linkage and to a bracket connected to the drive pumps at the opposite end so that the linear actuator and the pumps share a common anchorage, namely the resiliently mounted engine and hydraulic pumps. The bracket positions the linear actuator mount in close proximity (e.g., a foot) to the pintel arms and control linkage to further reduce unintended relative movement between the drive pumps and the linear actuator.

Positioning the actuator mounting bracket adjacent to the drive pumps reduces complexity of the control linkage movement apparatus, increases structural rigidity, and improve machine control response while offering a system that is easy to use and maintain, simple to manufacture, and cost effective.

These and other objects of the invention are addressed by a mounting apparatus for positioning an actuator managing the pivotal position of rotatable pintel arms controlling the output of a pair of tandem-mounted (e.g., one pump ahead of the other) hydraulic drive pumps providing motive power for an agricultural machine. The pumps are resiliently connected to the machine main frame, permitting relative movement to reduce vibration transmission to the main frame. A mounting bracket connected to the drive pumps provides a fixed connection for a first end of the actuator while the opposing second end is connected by an axially moveable linkage to the pintel arms. The common anchorage for the actuator and the pintel arms eliminates unintended pintel arm movement that occurs when anchoring the end of the actuator on the main frame.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
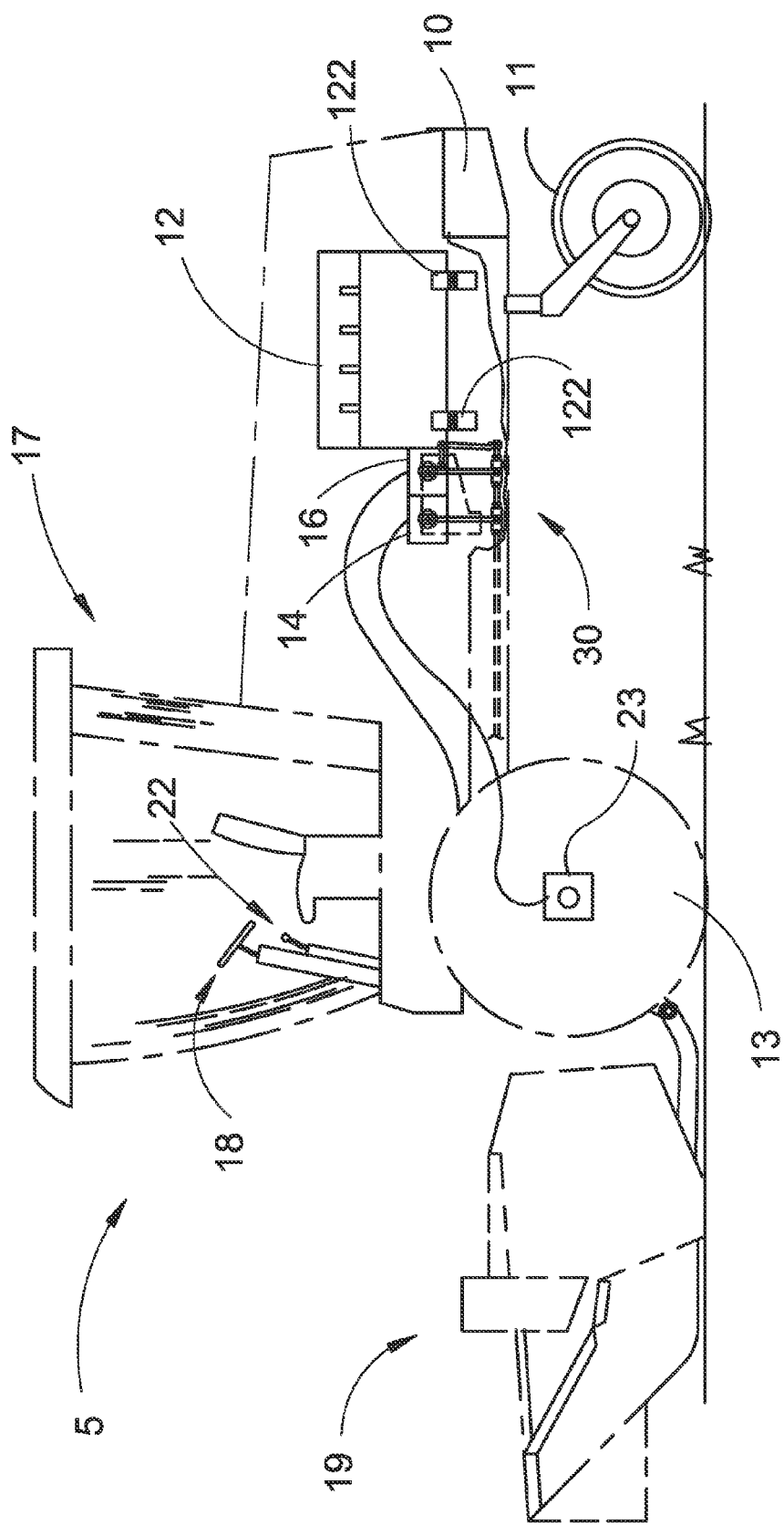
FIG. 1 is a side elevation view of a known differential steered agricultural windrower of the type with which the instant invention finds utility.

FIG. 1 illustrates an agricultural machine 5 of the type on which the present invention finds utility. The machine 5 illustrated is a well-known, self-propelled agricultural windrower employing differential speed of the driving wheels to steer the machine across the ground. The machine comprises a main frame 10 with a longitudinal horizontal axis from front to back, supported by a pair of drive wheels 13 on the front portion thereof and by a pair of steering caster wheels 11 adjacent to the rear end. The main frame 10 supports an operator cab 17 to provide an environmentally controlled location from which the machine may be comfortably operated, and a forwardly disposed header 19. Header 19 may be of several designs, but typically comprises a cutting mechanism, either a sickle bar or rotary cutter, a feeder mechanism, and, in many applications, conditioning rolls.

Power to the machine is provided by an engine 12 which is resiliently connected by isolators 122 to the main frame 10 to reduce vibration transmitted into the main frame 10 by the engine 12. The general mode of operation of a modern differential steered agricultural machine is to have tandem hydrostatic pumps 14, 16, one for each of two drive wheels 13, each pump having a depending pintel arm such that forward and reverse movement of the pintel arm relative to a neutral position pivots a swashplate in the associated hydrostatic pump allowing adjustment of the flow rate and flow direction, thus causing the associated drive motor 23 and wheel to rotate. The hydrostatic drive pumps 14, 16 are mounted in tandem directly to the engine 12. Control of the drive pumps from the operator cab 17 is accomplished by operator input from a steering wheel 18 (turning control) and a forward-neutral-reverse (FNR) speed selector 22 operably connected to a drive control mechanism 30 adjacent to the drive pumps 14, 16. A detailed description of a differential steered agricultural machine is provided in U.S. Pat. No. 7,207,581 issued to Osborne, et al., the entirety of which is incorporated herein by reference.

Figure 2:
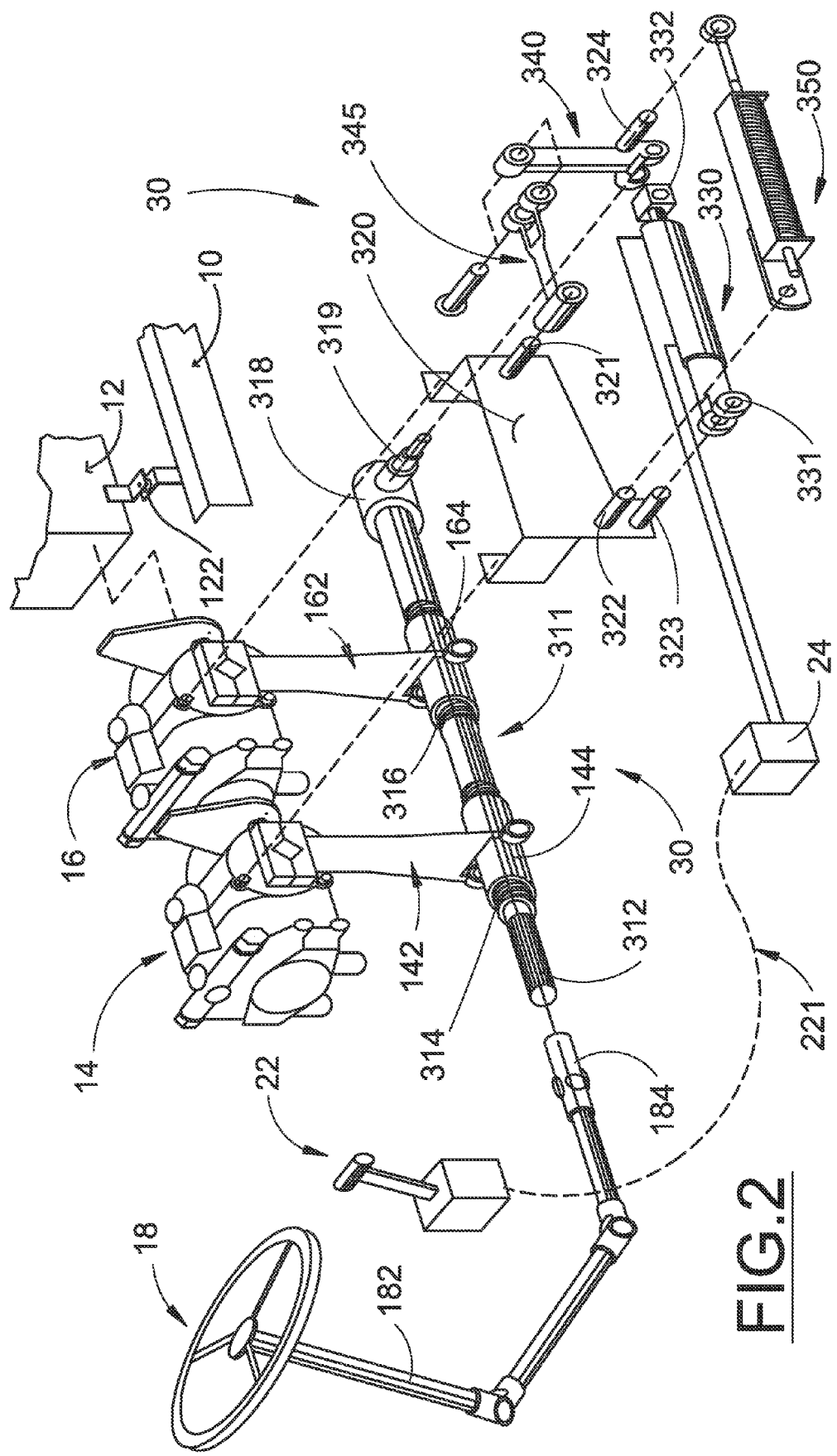
FIG. 2 is a partial perspective view of the hydrostatic control system for the windrower of FIG. 1 showing the drive pump control mechanism and mounting.

Referring now to FIG. 2, an exemplar hydrostatic control system is shown to include a conventional steering wheel 18 inside the operator's cab 17. The cab would, of course, include additional components (not shown) such as a seat, electrical and mechanical controls for operation of the machine, an air conditioning unit, and the like. The steering wheel 18 is attached to a rotatable steering shaft 182 that is connected to by universal connectors to the drive control mechanism 30. The universal connector is well known in the art as a mechanism to transmit rotational movement between two shafts that are not necessarily in axial alignment. The drive control mechanism 30 comprises a control input shaft 311 that engages pintel arms 142, 162 via internally threaded blocks 144, 164 to operably connect the control input shaft to the respective left and right hydrostatic drive pumps 14, 16. The pintel arm blocks 144, 164 engage drive threads 314, 316 on the control input shaft. The drive threads 314, 316 are reversed in relation to each other (one having right-hand thread and the other having left-hand threads) so that rotation of the input shaft 311 causes the blocks 144, 164 to move in opposite directions, either toward one another or away from one another dependent upon the rotation direction of the input shaft 311. This opposing motion in turn causes the pintel arms 142, 162 to rotate in opposite directions, one pintel arm rotating in a clockwise direction and the other rotating in a counter-clockwise direction, when viewed from the side, and alters the displacement of the drive pumps in an opposing manner (e.g., increase output flow in one while decreasing output flow in the other) allowing the machine to be steered by movement of the steering wheel 18. If the machine is in motion, this causes one drive pump to increase flow and the other to decrease flow, turning the machine; however, if the system is already in mechanical neutral, turning the steering wheel 18 increases flow in both pumps, but in opposite directions—the machine turning around itself with one drive wheel 13 going forward and one going in reverse.

Control input shaft 311 is also moveable axially to control the drive pumps 14, 16. The steering shaft 182 includes a sliding coupling comprising sleeve 184 and splined end 312 for connecting to the control input shaft 311 which allows longitudinal movement of the control input shaft 311 relative to the steering shaft 182. As the control input shaft is moved axially, the pintel arm blocks 144, 164 are moved forwardly or rearwardly causing the pintel arms 142, 162 to rotate in the same direction (either clockwise or counter-clockwise). Within cab 17 is the FNR lever 22 that is continuously and selectively movable to allow a change in speed of the machine in either the forward or reverse directions. Output 221 from the FNR lever 22 controls a hydraulic valve 24 which causes FNR actuator 330 to extend or retract to regulate the position of the control input shaft.

Known prior art mechanisms for connecting the FNR actuator to the control input shaft 311 typically anchored one end of the actuator to the machine frame. The engine and hydrostatic drive pumps are typically connected to the machine frame by vibrating isolating connections which allow some movement of the engine/pump assembly in relation to the frame. This movement, even though minor, can lead to unintended movement of the control input shaft and the resulting changing of the drive pump outputs. The present invention improves the mechanism by providing an anchor point for the FNR actuator and neutral biasing mechanism that is mounted directly on the engine/drive pump assembly so that no relative movement occurs between the actuator anchor point and the hydrostatic drive pumps.

Actuator 330 is connected at first end 332 to a spindle 319 on knuckle 318 which is mounted on control input shaft 311. The knuckle 318 allows rotation of the input shaft 311 while maintaining a fixed axial position on the shaft. An opposing second end 331 of actuator 330 is mounted on an anchor 323 fixed in relation to the drive pumps 14, 16 by a bracket 320 which is rigidly connected to the pumps. The bracket 320 may be a welded assembly, stamping, or the like providing a rigid structural connection between the pumps and the various anchorage points mounted thereon. As the actuator 330 is extended or retracted by user-selectable input of the FNR lever 22, the control input shaft 311 is moved axially forwardly or rearwardly. The connection of the bracket 320 directly to the drive pumps 14, 16 and positioning the actuator anchor 323 in close proximity assures that any movement of the FNR actuator is directly translated to axial movement of the control input shaft 311. A stabilizing linkage comprising links 340, 345 which are also anchored to the bracket 320 via anchor 321 guides movement of the knuckle 318 to avoid deflecting the input shaft 311 from its longitudinal axis and further improves movement of the control input shaft 311. A neutral bias element 350 connects between the control input shaft 311 (at pin connection 324) and the bracket 320 to bias the control input shaft 311 into a neutral position, that is one in which the drive pump output flows are essentially zero when the steering control is aligned for straight-ahead travel. As with the actuator 320, the anchor point 322 for the bias element 350 is attached to bracket 320 to minimize relative motion between the drive pumps and the bias element.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A speed and direction control mechanism for a differential speed steered agricultural machine comprising:
    a ground supported main frame;
    an engine resiliently connected to the main frame;
    right and left drive motors;
    right and left hydraulic drive pumps connected in tandem to and driven by the engine, each drive pump having a displacement control mechanism including a pintel arm rotatable between first and second positions, rotation of which changes hydraulic fluid flow rate from respective drive pumps to control speed and direction of respective drive motors;
    a control input shaft connected to the left and right pintel arms, the shaft rotatable about a longitudinal axis thereof and translatable along the longitudinal axis, rotation of the shaft causing simultaneous rotation of the pintel arms in opposite directions, translation of the shaft causing simultaneous rotation of the pintel arms in the same direction;
    a steering wheel and steering shaft operably connected to rotate the control input shaft to manage relative displacement of the right and left hydraulic pumps thereby enabling right and left drive motors to be driven at different speeds and/or directions;
    an actuator having a fixed end and a moveable end and variably axially positionable between first and second lengths, the moveable end connected to the control input shaft, the fixed end connected to the drive pumps, movement thereof causing translation of the shaft in either direction along its longitudinal axis; and
    a rigid mounting component positioned between the fixed end of the actuator and the pump, to mitigate a relative movement therebetween.

2. The mechanism of claim 1, wherein the control input shaft includes a first externally threaded portion and a second externally threaded portion, and each pintel arm includes an internally threaded connected block engaged on the first and second threaded portions, respectively, the threads connection of the pintel arms to the control input shaft.

3. The mechanism of claim 2, further comprising a steering shaft and a coupling disposed between the steering wheel and the control input shaft, the coupling having a splined interface connecting the steering shaft and the control input shaft to transfer rotational movement from the steering wheel to the control input shaft while permitting axial movement of the control input shaft relative to the steering wheel.

4. The mechanism of claim 3 wherein the actuator is a linear actuator.

5. A mechanism that controls speed and direction of travel of a self-propelled agricultural machine comprising:
    a machine main frame;
    an engine for propelling the machine, the engine being resiliently attached to the main frame;
    right and left hydraulic drive pumps connected in tandem to and driven by the engine, each drive pump having a displacement control mechanism including a pintel arm rotatable between first and second positions, rotation of the pintel arms changing hydraulic fluid flow rate from respective drive pumps to control speed and direction of travel of the machine;
    a control input shaft operably connected to the left and right pintel arms, the shaft rotatable about its longitudinal axis and translatable along its longitudinal axis, rotation of the shaft causing simultaneous rotation of the pintel arms in opposite directions, translation of the shaft causing simultaneous rotation of the pintel arms in the same direction;
    an actuator having a fixed end and a moveable end, the length therebetween being selectively variable between first and second lengths, the moveable end connected to the control input shaft, the fixed end connected to the drive pumps, variation in the length thereof moving the control input shaft in either direction along its longitudinal axis regardless of movement of the drive pumps relative to the main frame,
    the control input shaft includes a first externally threaded portion and a second externally threaded portion, and each pintel arm includes an internally threaded connected block engaged on the first and second threaded portions, respectively, the threads connection of the pintel arms to the control input shaft, and
    wherein the connection between the actuator fixed end and the pumps comprises a rigid bracket, to mitigate a relative motion therebetween.

6. The mechanism of claim 5, wherein the actuator is a linear actuator.

7. The mechanism of claim 6, further comprising a steering wheel and steering shaft operably connected to rotate the control input shaft.

8. A mechanism for controlling speed and direction of travel of a self-propelled agricultural machine comprising:
    a machine main frame;
    an engine for propelling the machine, the engine being resiliently attached to the main frame;
    right and left hydraulic drive pumps operably supported in tandem and driven by the engine, each drive pump having a displacement control mechanism including a pintel arm rotatable between first and second positions, rotation of the pintel arms changing hydraulic fluid flow rate from respective drive pumps to control speed and direction of travel of the machine;
    a control input shaft operably connected to the left and right pintel arms, the shaft rotatable about its longitudinal axis and translatable along its longitudinal axis, rotation of the shaft causing simultaneous rotation of the pintel arms in opposite directions, translation of the shaft causing simultaneous rotation of the pintel arms in the same direction; and
    an elongate actuator having a selectively variable length between generally opposing first and second ends, the first end connected to the control input shaft for movement therewith,
    a rigid component that anchors the second end to the hydraulic drive pumps to substantially prevent relative motion between the drive pumps and the main frame from axially moving the control shaft.

9. The mechanism of claim 7, wherein the actuator is a linear actuator.

10. A control assembly comprising:
a controller that regulates a swash plate angle for a hydraulic pump; and
a mounting component that mounts the controller to the hydraulic pump, to mitigate a movement of the controller relative to the hydraulic pump; the mounting component rigidly connected to the hydraulic pump,
wherein any movement of the control assembly occurs as a single unit, with substantially no relative movement between the controller and hydraulic pump affecting the swash plate angle.

* * * * *